(No Model.)

E. D. MEAGHER.
PLOW.

No. 271,893.  Patented Feb. 6, 1883.

Attest:
Walter Donaldson
F. L. Middleton

Inventor
Edmund D. Meagher
By Ellis Spear
Atty.

UNITED STATES PATENT OFFICE.

EDMUND D. MEAGHER, OF SOUTH BEND, INDIANA, ASSIGNOR TO THE ECONOMIST PLOW COMPANY, OF SAME PLACE.

PLOW.

SPECIFICATION forming part of Letters Patent No. 271,893, dated February 6, 1883.

Application filed December 18, 1882. (No model.)

*To all whom it may concern:*

Be it known that I, EDMUND D. MEAGHER, of South Bend, in the county of St. Joseph and State of Indiana, have invented a new and useful Improvement in Plows; and I do hereby declare that the following is a full, clear, and exact description of the same.

My invention relates to plows having a share with wing reversible independently of the point; and it consists in forming the wings with a twist, and, in connection with a twisted wing, in forming that part of the standard and foot on which the wing rests with a similar twist, whereby the share is better fitted to perform its work, all as hereinafter fully set forth.

In the accompanying drawings I have shown a form of plow in principle, in respect to the reversible wing or share and point, the same as that shown in Letters Patent of the United States granted me on the 7th day of February, 1882, and numbered 253,408, with the exception of the twist in the wing and the plow-foot.

Figure 1:
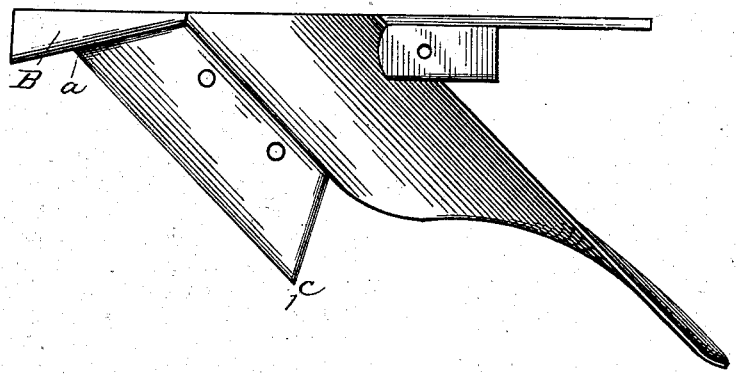
Figure 2:
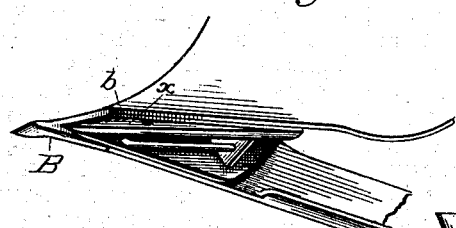
Figure 3:
Figure 4:
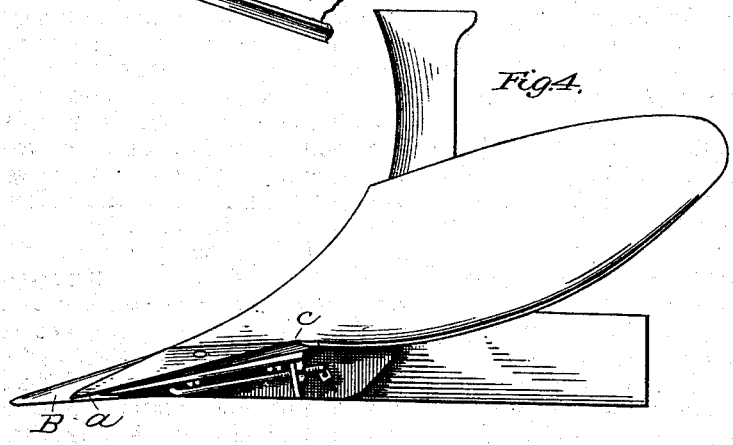

In the drawings, Figure 1 is a plan view of a plow embodying my improvement. Fig. 2 is a view of the plow tilted, with the wing removed, and showing the twist of the seat; Fig. 3, a view of the wing detached. Fig. 4 also represents the plow tilted, with the wing in place.

In the form of plow described in my said patent the wing is reversible independently of the point. As shown at C in the accompanying drawings, it is symmetrical in shape, so that it may be turned over and either end be brought against the side of the point B. The special construction of the joining edges is not material to the invention herein set forth, and is not particularly described.

In the aforesaid patent there is no mention of any twist in the wing of the plowshare, and when made with plane surfaces it has certain defects. First, the corner of the cutting-edge next the point is brought too high, and in working leaves a little ridge of earth in the bottom of the furrow. If the wing is set at the proper angle, so the inner corner of its cutting-edge will come close enough to the furrow-bottom, the outer corner will stand at too steep an angle, and only the extreme edge will touch. This causes the edge to dig down at the outer corner, throwing the plow over on the mold-board and preventing the plow from running level. These difficulties might be avoided by dropping the line of juncture of the wing and mold-board low enough to get the required angle, were it not that this brings the lower side of the plow-foot so near the furrow-bottom that the heads of the bolts which hold the wing will rub the bottom of the furrow, and no vacant space will be left for the insertion of the point-retaining hook shown in my patent. Instead, therefore, of forming the wing with plane faces, I twist it so that the front and rear edges are not in parallel planes, but in planes crossing each other near the center. The inner front corner, $a$, is depressed below the plane of the rear line or edges, and the outer front corner is as much elevated. This gives the proper inclination to the outer end of the wing and adapts the inner end to the point. Reversal of the wing—*i. e.*, turning it over endwise—will bring the parts into precisely the same position. The wing fits upon its seat in the foot of the plow-standard against a shoulder, $b$, so that the rear edge of the wing always is held at the same level with the plow. Obviously, when the inner depressed corner, $a$, is brought, by turning the wing over endwise, into the place of the corner $c$, it will then be above the line of the back, and the corner $c$, now in the place formerly occupied by $a$, will be below. It will be apparent that the foot of the plow-standard must have a like twisted surface, $x$, to receive the wing and hold it firmly in place. With such a twisted surface on the foot of the standard a steel flexible plate might be used instead of a rigid cast-metal wing, this plate being sprung into the twisted form by means of the bolts drawing it down snugly to its seat.

What I claim as my invention is—

The described reversible and twisted wing or share, in combination with the mold-board and point of a plow, substantially as set forth.

In testimony whereof I have signed my name to this specification in the presence of two subscribing witnesses.

EDMUND D. MEAGHER.

Witnesses:
JOHN M. CHAPMAN,
JOSEPH E. MORLEY.